Patented Jan. 6, 1942

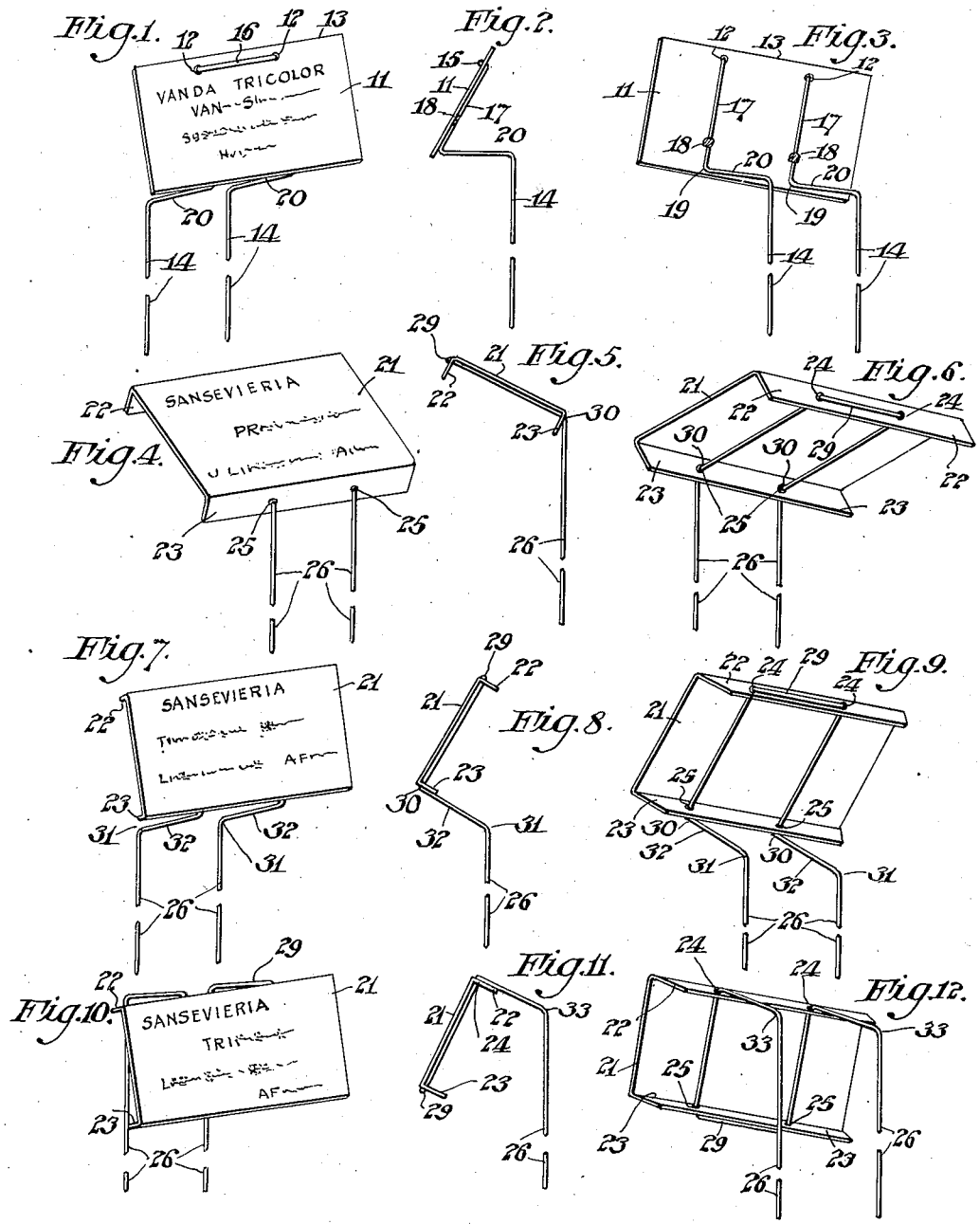

2,269,087

UNITED STATES PATENT OFFICE 2,269,087

PLANT MARKER

Jacob R. Schramm, Philadelphia, Pa.

Application July 11, 1939, Serial No. 283,754

2 Claims. (Cl. 40—25)

The invention relates to improvements in plant markers; the object being to provide a convenient and substantial device for marking the plant usually with its botanical name and its habitat.

The invention comprises a substantially flat plate of weather resisting material such as stainless steel, aluminum or other non-oxidizing material. This plate is marked or lettered in any suitable way to indicate the plant with which it is to be associated. In the present example this marking is done by the embossment of said letters upon the face of the plate. Obviously other methods of forming the letters may be used.

This plate is provided with suitable supporting means secured to such plate. The supporting means or element may consist of a wire or strand, preferably of metal, which is adapted to be inserted in the soil adjacent the plant, or attached directly to the plant.

The plate is associated with the supporting element in such manner as to present the face thereof in such a plane as to be most convenient to the observer; such supporting means being adapted for convenient adjustment of the angle of said plane to the perpendicular.

Referring to the drawing which illustrates merely by way of example, suitable embodiments of the invention—

Fig. 1 is a front view in perspective, Fig. 2 is a side elevation, and Fig. 3 is a rear view in perspective, of one embodiment in its simplest form.

Figs. 4, 5 and 6 are similar views of another embodiment in which the plate is provided with right angular flanges along its longitudinal side margins.

Figs. 7, 8 and 9, and 10, 11 and 12 are similar views, all showing flanged plates with different arrangements of the support.

Similar numerals refer to similar parts throughout the several views.

As shown in Figs. 1, 2 and 3, the marker consists of a substantially flat sheet or plate 11, having two holes 12, spaced apart and close to and in a line parallel with the upper longitudinal margin 13. The supporting wire or element 14 is provided near its middle part with two spaced apart bends 15. The straight extension 16 between the two bends is adapted to lie along the face of the plate close to and parallel with its upper margin. The said two bends 15 permit the wire extensions to pass through the holes 12. After passing through the holes 12 the wires are bent transversely of bends 15, so as to provide parallel extensions 17, across the underside of the plate 11. These parallel extensions 17 are then preferably secured to said underside of the plate by solder, spot welding, or the like, as at 18, and then bent as at 19, into extensions 20 at an angle slightly acute to the plane of the plate. At the ends of these extensions 20 the wires are again bent into right angled relationship with said extensions 20. The balance of said wire extensions are straight and parallel and free to be inserted into the ground close to the plant, with the plate inclined sufficiently for convenient reading.

In the devices shown in Figs. 4 to 12 inclusive, the plate 21 is provided with longitudinally extending right angular flanges 22 and 23. Flange 22 is provided with holes 24, and flange 23 is provided with holes 25; the holes 24 of one flange, registering with the holes 25 of the other flange.

In accordance with the device shown in Figs. 4 to 6 inclusive, the wire or supporting element 26 is provided near its middle part with two bends leaving a short straight extension 29 between said bends. The free ends of the parallel extensions are threaded through the holes 24 in the upper flange 22 and then through holes 25 in the lower flange 23. After passing through the holes 25 the two wire extensions are bent at an angle, as at 30, to the main plane of the plate and then extend straight and parallel to their free ends. The bends at 30 serve two purposes, one to secure the plate from sliding upon the wire extensions, and also to hold the plate at the proper inclination for convenient examination or reading.

The device in accordance with Figs. 7 to 9 inclusive, is similar to the device shown in Figs. 4 to 6 inclusive, except that the wires are provided with the additional bends 31, offsetting short straight parallel extensions 32 between the bends 30 and 31. This arrangement makes it possible to insert the wire extensions into the ground at a safe distance from the plant roots, while maintaining the plate sufficiently near the plant.

In Figs. 4 to 9 inclusive, the device is shown with the wire extensions first passing through the holes 24 in the upper flange 22, and the short straight extension 29 resting upon the upper face of flange 22. While in the device in accordance with Figs. 10 to 12 inclusive, the arrangement in this respect is reversed, that is, the wire extensions are first passed through the holes 25 in the lower flange 23. The offsetting and the inclination of the plane of the face of the plate are controlled by the angularity of the bends 33.

These various structural differences have been found useful in meeting different planting situations, or conditions.

What I claim is:

1. A plant marker comprising a name plate and a support therefor, the plate provided with oppositely disposed marginal flanges extending at right angles to the plane of the plate, said flanges provided with spaced apart wire receiving holes, the support comprising a wire bent to provide a relatively short straight middle part and terminating in parallel extensions at right angles to said middle part, the wire extensions at the ends of the said middle part passing through the holes in the flanged portions of the plate and secured in fixed relationship with respect to the plate.

2. A plant marker comprising a name plate and a support therefor, the plate provided with oppositely disposed marginal flanges extending at right angles to the plane of the plate, said flanges provided with spaced apart wire receiving holes, the support comprising a wire bent to provide a relatively short straight middle part and terminating in parallel extensions at right angles to said middle part, the wire extensions at the ends of the said middle part passing through the holes in the flanged portions of the plate and secured in fixed relationship with respect to the plate, the two wire extensions also provided with angular bends to secure the proper inclination of the plate.

JACOB R. SCHRAMM.